(12) United States Patent
Song et al.

(10) Patent No.: US 9,163,166 B2
(45) Date of Patent: Oct. 20, 2015

(54) ADHESIVE COMPOSITION, OPTICAL MEMBER, AND SURFACE PROTECTIVE SHEET

(75) Inventors: Cheong Hun Song, Uiwang-si (KR); Tatsuhiro Suwa, Kanagawa (JP); Hiroshi Ogawa, Kanagawa (JP)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 12/801,109

(22) Filed: May 24, 2010

(65) Prior Publication Data

US 2010/0239859 A1 Sep. 23, 2010

Related U.S. Application Data

(63) Continuation of application No. PCT/KR2008/006501, filed on Nov. 4, 2008.

(30) Foreign Application Priority Data

Nov. 22, 2007 (JP) ................................. 2007-302702

(51) Int. Cl.
| | |
|---|---|
| C09J 11/06 | (2006.01) |
| C09J 133/26 | (2006.01) |
| G02B 5/30 | (2006.01) |
| G02B 1/16 | (2015.01) |
| C08K 5/3432 | (2006.01) |
| C08K 5/3435 | (2006.01) |
| C08K 5/49 | (2006.01) |
| C09J 133/08 | (2006.01) |

(52) U.S. Cl.
CPC ............. *C09J 11/06* (2013.01); *C08K 5/3432* (2013.01); *C08K 5/3435* (2013.01); *C08K 5/49* (2013.01); *C09J 133/08* (2013.01); *C09J 133/26* (2013.01); *G02B 1/16* (2013.01); *G02B 5/305* (2013.01); *Y10T 428/2887* (2015.01)

(58) Field of Classification Search
None
See application file for complete search history.

(56) References Cited

U.S. PATENT DOCUMENTS

| | | | |
|---|---|---|---|
| 6,582,789 B1* | 6/2003 | Sumi ............................ | 428/40.1 |
| 6,893,718 B2 | 5/2005 | Melancon et al. | |
| 2006/0057370 A1* | 3/2006 | Pasquier et al. ............... | 428/350 |
| 2006/0081820 A1* | 4/2006 | Li et al. ......................... | 252/500 |
| 2008/0311395 A1 | 12/2008 | Ukei et al. | |
| 2009/0042004 A1 | 2/2009 | Yano et al. | |
| 2009/0068388 A1 | 3/2009 | Tanaka et al. | |
| 2009/0104445 A1* | 4/2009 | Inoue et al. ............... | 428/355 N |
| 2009/0163626 A1 | 6/2009 | Ukei et al. | |
| 2009/0258224 A1 | 10/2009 | Kawabe et al. | |
| 2010/0038023 A1 | 2/2010 | Kho et al. | |

FOREIGN PATENT DOCUMENTS

| | | |
|---|---|---|
| EP | 1923444 A1 | 5/2008 |
| JP | 09-176603 A | 7/1997 |
| JP | 2003-165965 A | 6/2003 |
| JP | 2003-329838 A | 11/2003 |
| JP | 2006-011365 A | 1/2006 |
| JP | 2007-023174 A | 2/2007 |
| JP | 2007-070400 A | 3/2007 |
| JP | 2007-084632 A | 4/2007 |
| JP | 2007-092056 A | 4/2007 |
| JP | 2007/092057 A | 4/2007 |
| JP | 2007-138147 A | 6/2007 |
| JP | 2007-264092 A | 10/2007 |
| WO | WO 2007/029644 A1 | 3/2007 |
| WO | WO 2007/046396 A1 | 4/2007 |
| WO | WO 2007/108659 A1 | 9/2007 |
| WO | WO 2007/111200 A1 | 10/2007 |
| WO | WO2007111138 * | 10/2007 |

OTHER PUBLICATIONS

Chinese Office Action in CN 200880117511.4, dated Aug. 17, 2011 (Kho, et al.).
European Search Report in EP 08851821.2-1301, dated Mar. 27, 2013 (Song, et al.).
Japanese Office Action in JP 2010-534874, dated Apr. 23, 2013.
Office Action mailed Sep. 2, 2014 in corresponding Japanese Patent Application No. 2013-152830.

\* cited by examiner

*Primary Examiner* — Samir Shah
(74) *Attorney, Agent, or Firm* — Lee & Morse, P.C.

(57) ABSTRACT

An adhesive composition includes a copolymer (A), the copolymer (A) being a copolymer of: a hydroxyl group-containing (meth)acrylamide (a1), the hydroxyl group-containing (meth)acrylamide (a1) including at least one of a hydroxyl group-containing acrylamide and a hydroxyl group-containing methacrylamide, and a (meth)acrylate (a2), the (meth)acrylate (a2) including at least one of an acrylic ester and a methacrylic ester; and an antistatic agent (B), the antistatic agent (B) including an ionic compound.

8 Claims, 8 Drawing Sheets

FIG. 1: Table 1

| Ingredient ratio of adhesive composition | | Example | | | | | | | | | |
|---|---|---|---|---|---|---|---|---|---|---|---|
| | | 1 | 2 | 3 | 4 | 5 | 6 | 7 | 8 | 9 | 10 |
| Monomer compositions | BA | 98.99 | 99.8 | 87.5 | 95 | 89.95 | 93 | 93.8 | 86.2 | 81.7 | 91.3 |
| | 2EHA | | | 10 | | 5 | 3 | 4 | 9 | 15 | 5 |
| | HEAA | 1 | 0.1 | 0.5 | 3 | 5 | 2 | 1 | 3 | 1 | 1 |
| | HEA | | | | | | | | | 1 | |
| | 4HBA | | | | | | | | | | 1 |
| | AA | | | | | | | 0.2 | 0.8 | 0.3 | 0.7 |
| Ionic compounds | IC 1 | 0.01 | | | | 0.05 | 2 | 1 | | | |
| | IC 2 | | 0.1 | | | | | | 1 | | |
| | IC 3 | | | 2 | | | | | | 1 | |
| | IC 4 | | | | 2 | | | | | | 1 |
| Total (wt.%) | | 100 | 100 | 100 | 100 | 100 | 100 | 100 | 100 | 100 | 100 |
| Viscosity (mPa · s) | | 4500 | 5500 | 3500 | 3500 | 3000 | 4000 | 5000 | 3000 | 2500 | 3500 |
| Concentration (wt.%) | | 20 | 20 | 20 | 20 | 20 | 20 | 20 | 20 | 20 | 20 |
| Average-weight molecular weight (million) | | 1.6 | 1.7 | 1.4 | 1.3 | 1.2 | 1.4 | 1.5 | 1.2 | 1.1 | 1.4 |

BA: butyl acrylate
2EHA: 2-ethylhexyl acrylate
HEAA hydroxyethylacryl amide
HEA 2-hydroxyethyl acrylate
4HBA 4-hydroxybutyl acrylate
AA acrylic acid
IC (ionic compound) 1    1-hexyl-3-methylimidazolium hexafluorophosphate (obtained from Tokyo Chemical Industry Co., Ltd.)
IC (ionic compound) 2    N-methyl-N-propylpiperidinium bis(trifluoromethanesulfonyl)imide (obtained from Kanto Chemical Co., Ltd.)
IC (ionic compound) 3    1-ethylpyridinium bromide (obtained from Tokyo Chemical Industry Co., Ltd.)
IC (ionic compound) 4    1-butyl-3-methylpyridinium trifluoromethanesulfonate (obtained from Tokyo Chemical Industry Co., Ltd.)

FIG. 2: Table 2

| Ingredient ratio of adhesive composition | | Example | | | | | |
|---|---|---|---|---|---|---|---|
| | | 11 | 12 | 13 | 14 | 15 | 16 |
| Monomer compositions | BA | 99 | 97.5 | 99.85 | 82 | 93.45 | 93.2 |
| | 2EHA | - | - | - | 10 | 4 | - |
| | DEAA | - | - | - | - | - | 4.8 |
| | HEAA | | | 0.05 | - | 0.05 | - |
| | HEA | 1 | 1 | - | - | - | 1 |
| | 4HBA | - | - | - | - | - | - |
| | AM | - | 0.5 | - | - | - | - |
| | AA | - | - | - | - | 0.7 | - |
| Ionic Compound | IC 1 | - | 1 | 0.1 | 1 | - | - |
| | IC 2 | - | - | - | - | 1.8 | - |
| | IC 5 | - | - | - | - | - | 1 |
| Total (wt.%) | | 100 | 100 | 100 | 100 | 100 | 100 |
| Viscosity (mPa·s) | | 5000 | 4000 | 5000 | 2500 | 4000 | 2000 |
| solid (%) | | 20 | 20 | 20 | 20 | 20 | 20 |
| Average-weight molecular weight (million) | | 1.8 | 1.6 | 1.7 | 1.2 | 1.7 | 1.0 |
| BA: | butyl acrylate |
| 2EHA: | 2-ethylhexyl acrylate |
| DEAA | N,N-diethyl acrylamide |
| HEAA | hydroxyethylacryl amide |
| HEA | 2-hydroxyethyl acrylate |
| 4HBA | 4-hydroxybutyl acrylate |
| AM | acrylamide |
| AA | acrylic acid |
| IC (ionic compound) 1 | 1-hexyl-3-methylimidazolium hexafluorophosphate (obtained from Tokyo Chemical Industry Co., Ltd.) |
| IC (ionic compound) 2 | N-methyl-N-propylpiperidinium bis(trifluoromethanesulfonyl)imide (obtained from Kanto Chemical Co., Ltd.) |
| IC (ionic compound) 5 | 1-butyl-3-methylpyridinium bis(trifluoromethanesulfonyl)imide (obtained from SigmaAdrich Japan Co., Ltd.) |

FIG. 3: Table 3

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| A: adhesive composition (part by weight) | | 100 | 100 | 100 | 100 | 100 | 100 | 100 | 100 | 100 | 100 |
| B: crosslinking agent (part by weight) | | 0.1 | 1 | 0.2 | 0.1 | 0.1 | 0.15 | 0.2 | 0.1 | 0.08 | 0.08 |
| C: silane coupling agent (part by weight) | | 0.1 | 0.1 | 0.1 | 0.1 | 0.1 | 0.1 | 0.1 | 0.1 | 0.1 | 0.1 |
| Viscosity of adhesive composition solution (mPa·s) | | 4000 | 5000 | 3000 | 3000 | 2500 | 3500 | 4500 | 2500 | 2000 | 3000 |
| Concentration of adhesive composition solution (wt.%) | | 18 | 18 | 18 | 18 | 18 | 18 | 18 | 18 | 18 | 18 |
| Gel fraction of adhesive composition (%) | | 71 | 69 | 74 | 68 | 66 | 70 | 69 | 73 | 65 | 72 |
| Period of obtaining stabilized gel fraction | | 3 | 3 | 3 | 3 | 3 | 3 | 3 | 3 | 3 | 3 |
| Performance Test | Surface resistance ($\Omega/cm^2$) | $10^{11}$ | $10^{11}$ | $10^{9}$ | $10^{8}$ | $10^{11}$ | $10^{10}$ | $10^{9}$ | $10^{9}$ | $10^{10}$ | $10^{10}$ |
| | Metal Corrosiveness | ○ | ○ | ○ | ○ | ○ | ○ | ○ | ○ | ○ | ○ |
| | Light leakage | ○ | ○ | ○ | ○ | ○ | ○ | ○ | ○ | ○ | ○ |
| | Durability | ○ | ○ | ○ | ○ | ○ | ○ | ○ | ○ | ○ | ○ |
| | Adhesive force (N/25 mm) | 4 | 5 | 8 | 6 | 6 | 5 | 4 | 6 | 7 | 7 |
| | Adhesion to Substrate | ○ | ○ | ○ | ○ | ○ | ○ | ○ | ○ | ○ | ○ |
| | Contamination of attachment target | ○ | ○ | ○ | ○ | ○ | ○ | ○ | ○ | ○ | ○ |
| | Low temperature stability | ○ | ○ | ○ | ○ | ○ | ○ | ○ | ○ | ○ | ○ |
| | reworkability | ○ | ○ | ○ | ○ | ○ | ○ | ○ | ○ | ○ | ○ |

A: Adhesive composition shown in Table 1
B: trimethylolpropane/tolylene diisocyanate trimer adduct (Coronate HL™, available from Nippon Polyurethane Industry Co., Ltd.)
C: glycidoxypropyltrimethoxysilane (Shin-Etsu Silicone KBM-403™, available from Shin-Etsu Chemical Industry Co., Ltd.)

FIG. 4: Table 4

|  |  | Example | | | | | |
| --- | --- | --- | --- | --- | --- | --- | --- |
|  |  | 11 | 12 | 13 | 14 | 15 | 16 |
| A: adhesive composition (part by weight) | | 100 | 100 | 100 | 100 | 100 | 100 |
| B: crosslinking agent (part by weight) | | 0.1 | 0.1 | 0.2 | 0.05 | 1.0 | 0.1 |
| C: silane coupling agent (part by weight) | | 0.1 | 0.1 | 0.1 | 0.1 | 0.1 | 0.1 |
| Viscosity of adhesive composition solution (mPa·s) | | 4500 | 3500 | 4500 | 2000 | 3500 | 1500 |
| Concentration of adhesive composition solution (wt.%) | | 18 | 18 | 18 | 18 | 18 | 18 |
| Gel fraction of adhesive composition (%) | | 69 | 66 | 69 | 72 | 73 | 68 |
| Period until the gel fraction is stabilized | | 10 | 10 | 7 | 3 | 5 | 10 |
| Performance Test | Surface resistance ($\Omega/cm^2$) | $10^{15}$ | $10^{10}$ | $10^{14}$ | $10^9$ | $10^9$ | $10^{10}$ |
|  | Metal Corrosiveness | O | O | O | O | O | O |
|  | Light leakage | O | O | O | O | O | X |
|  | durability | O | O | X | X | X | X |
|  | Adhesive force (N/25 mm) | 4 | 4 | 7 | 3 | 4 | 5 |
|  | Adhesion to Substrate | O | O | O | O | O | O |
|  | Contamination of attachment target | O | O | O | O | O | O |
|  | Low temperature stability | O | O | O | O | O | O |
|  | reworkability | O | O | X | O | X | O |

A: Adhesive composition shown in Table 2
B: trimethylolpropane/trilene diisocyanate (Coronate L™, available from Nippon Polyurethane Industry Co., Ltd.)
C: glycidoxypropyltrimethoxysilane (Shin-Etsu Silicone KBM-403™, available from Shin-Etsu Chemical Industry Co., Ltd.)

FIG. 5: Table 5

| Ingredient ratio of adhesive composition | | Example | | | | | | | | | |
|---|---|---|---|---|---|---|---|---|---|---|---|
| | | 17 | 18 | 19 | 20 | 21 | 22 | 23 | 24 | 25 | 26 |
| Monomer compositions | BA | 40 | | 10.8 | 10 | 5 | 2 | 20 | | 8 | 5 |
| | 2EHA | 58.99 | 97.9 | 80 | 87 | 91.95 | 91.8 | 77.2 | 96 | 89 | 91.9 |
| | HEAA | 1 | 2 | 7 | 1 | 3 | 6 | 2 | 2 | 1 | 1 |
| | HEA | | | | | | | | | 1 | |
| | 4HBA | | | | | | | | | | 1 |
| | AA | | | 0.2 | | | 0.1 | | | | 0.1 |
| Ionic compounds | IC 1 | 0.01 | | | | 0.05 | 0.1 | 0.8 | 2 | | |
| | IC 2 | | 0.1 | | | | | | | | |
| | IC 3 | | | 2 | | | | | | 1 | |
| | IC 4 | | | | 2 | | | | | | 1 |
| Total (wt.%) | | 100 | 100 | 100 | 100 | 100 | 100 | 100 | 100 | 100 | 100 |
| Viscosity (mPa·s) | | 3500 | 1500 | 1000 | 1500 | 2000 | 1000 | 2500 | 1500 | 1500 | 1500 |
| Concentration (wt.%) | | 35 | 35 | 35 | 35 | 35 | 35 | 35 | 35 | 35 | 35 |
| Average-weight molecular weight (million) | | 0.8 | 0.3 | 0.5 | 0.4 | 0.4 | 0.4 | 0.5 | 0.3 | 0.3 | 0.4 |

BA: butyl acrylate
2EHA: 2-ethylhexyl acrylate
HEAA hydroxyethylacryl amide
HEA 2-hydroxyethyl acrylate
4HBA 4-hydroxybutyl acrylate
AA acrylic acid
IC (ionic compound) 1 1-hexyl-3-methylimidazolium hexafluorophosphate (obtained from Tokyo Chemical Industry Co., Ltd.)
IC (ionic compound) 2 N-methyl-N-propylpiperidinium bis(trifluoromethanesulfonyl)imide (obtained from Kanto Chemical Co., Ltd.)
IC (ionic compound) 3 1-ethylpyridinium bromide (obtained from Tokyo Chemical Industry Co., Ltd.)
IC (ionic compound) 4 1-butyl-3-methylpyridinium trifluoromethanesulfonate (obtained from Tokyo Chemical Industry Co., Ltd.)

FIG. 6: Table 6

| Ingredient ratio of adhesive composition | | Example | | | | | |
|---|---|---|---|---|---|---|---|
| | | 27 | 28 | 29 | 30 | 31 | 32 |
| Monomer compositions | BA | 10 | 40 | - | 10 | 2 | - |
| | 2EHA | 89 | 57.5 | 99.85 | 77 | 95.45 | 85.7 |
| | DEAA | - | - | - | - | - | 4.8 |
| | HEAA | | | 0.05 | 12 | 0.05 | - |
| | HEA | 1 | 1 | - | - | - | 3.8 |
| | 4HBA | - | - | - | - | - | - |
| | AM | - | 0.5 | - | - | - | - |
| | AA | - | - | - | - | 0.3 | - |
| Ionic Compound | IC 1 | - | 1 | 0.1 | 1 | - | - |
| | IC 2 | - | - | - | - | 2.2 | - |
| | IC 5 | - | - | - | - | - | 5.7 |
| Total (wt.%) | | 100 | 100 | 100 | 100 | 100 | 100 |
| Viscosity (mPa · s) | | 3500 | 4000 | 2000 | 2000 | 2000 | 1500 |
| solid (%) | | 35 | 35 | 35 | 35 | 35 | 35 |
| Average-weight molecular weight (million) | | 0.6 | 0.9 | 0.3 | 0.4 | 0.4 | 0.6 |

| | |
|---|---|
| BA: | butyl acrylate |
| 2EHA: | 2-ethylhexyl acrylate |
| DEAA | N,N-diethyl acrylamide |
| HEAA | hydroxyethylacryl amide |
| HEA | 2-hydroxyethyl acrylate |
| 4HBA | 4-hydroxybutyl acrylate |
| AM | acrylamide |
| AA | acrylic acid |
| IC (ionic compound) 1 | 1-hexyl-3-methylimidazolium hexafluorophosphate (obtained from Tokyo Chemical Industry Co., Ltd.) |
| IC (ionic compound) 2 | N-methyl-N-propylpiperidinium bis(trifluoromethanesulfonyl)imide (obtained from Kanto Chemical Co., Ltd.) |
| IC (ionic compound) 5 | 1-butyl-3-methylpyridinium bis(trifluoromethanesulfonyl)imide (obtained from SigmaAdrich Japan Co., Ltd.) |

FIG. 7: Table 7

|  |  | Example | | | | | | | | | |
|---|---|---|---|---|---|---|---|---|---|---|---|
|  |  | 17 | 18 | 19 | 20 | 21 | 22 | 23 | 24 | 25 | 26 |
| A:adhesive composition (parts by weight) | | 100 | 100 | 100 | 100 | 100 | 100 | 100 | 100 | 100 | 100 |
| B:crosslinking agent (parts by weight) | | 0.1 | 1.5 | 3 | 1 | 2 | 3 | 1 | 1 | 1 | 1 |
| Viscosity of adhesive composition solution (mPa·s) | | 3500 | 1000 | 700 | 1000 | 1500 | 700 | 2000 | 1000 | 1000 | 1000 |
| Concentration of adhesive composition solution (wt.%) | | 32 | 32 | 32 | 32 | 32 | 32 | 32 | 32 | 32 | 32 |
| Gel fraction of adhesive composition (%) | | 94 | 95 | 98 | 96 | 97 | 95 | 95 | 96 | 94 | 97 |
| Period of obtaining stabilized gel fraction | | 3 | 3 | 3 | 3 | 3 | 3 | 3 | 3 | 3 | 3 |
| Performance Test | Surface resistance ($\Omega/cm^2$) | $10^{11}$ | $10^{11}$ | $10^9$ | $10^8$ | $10^{11}$ | $10^{10}$ | $10^9$ | $10^9$ | $10^{10}$ | $10^{10}$ |
| | Metal Corrosiveness | ○ | ○ | ○ | ○ | ○ | ○ | ○ | ○ | ○ | ○ |
| | Adhesive force (N/25 mm) | 0.1 | 0.1 | 0.12 | 0.12 | 0.13 | 0.1 | 0.15 | 0.15 | 0.12 | 0.13 |
| | Adhesion to Substrate | ○ | ○ | ○ | ○ | ○ | ○ | ○ | ○ | ○ | ○ |
| | Contamination of attachment target | ○ | ○ | ○ | ○ | ○ | ○ | ○ | ○ | ○ | ○ |
| | Low temperature stability | ○ | ○ | ○ | ○ | ○ | ○ | ○ | ○ | ○ | ○ |
| | Transparency of adhesive layer | ○ | ○ | ○ | ○ | ○ | ○ | ○ | ○ | ○ | ○ |
| A: Adhesive composition shown in Table 5 | | | | | | | | | | | |
| B: hexamethylene diisocyanate (Coronate HX™, available from Nippon Polyurethane Industry Co., Ltd.) | | | | | | | | | | | |

FIG. 8: Table 8

| | | Example | | | | | |
|---|---|---|---|---|---|---|---|
| | | 27 | 28 | 29 | 30 | 31 | 32 |
| A: adhesive composition (parts by weight) | | 100 | 100 | 100 | 100 | 100 | 100 |
| B: crosslinking agent (parts by weight) | | 1 | 1 | 0.5 | 4 | 1 | 1 |
| Viscosity of adhesive composition solution (mPa·s) | | 3000 | 3500 | 1500 | 1500 | 1500 | 1000 |
| Concentration of adhesive composition solution (wt.%) | | 32 | 32 | 32 | 32 | 32 | 32 |
| Gel fraction of adhesive composition (%) | | 94 | 95 | 97 | 96 | 96 | 94 |
| Period until the gel fraction stabilized | | 10 | 10 | 7 | 3 | 5 | 10 |
| Performance Test | Surface resistance ($\Omega/cm^2$) | $10^{15}$ | $10^{10}$ | $10^{14}$ | $10^{9}$ | $10^{9}$ | $10^{8}$ |
| | Metal Corrosiveness | ○ | ○ | ○ | ○ | ○ | ○ |
| | Adhesive force (N/25 mm) | 0.10 | 0.15 | 0.11 | 0.12 | 0.09 | 0.18 |
| | Adhesion to Substrate | ○ | ○ | ○ | X | ○ | X |
| | Contamination of attachment target | ○ | ○ | ○ | ○ | X | X |
| | Low temperature stability | ○ | ○ | ○ | ○ | ○ | ○ |
| | Transparency of adhesive layer | ○ | ○ | ○ | X | ○ | ○ |
| A: Adhesive composition shown in Table 6 | | | | | | | |
| B: hexamethylene diisocyanate (Coronate HX™, available from Nippon Polyurethane Industry Co., Ltd.) | | | | | | | |

ADHESIVE COMPOSITION, OPTICAL MEMBER, AND SURFACE PROTECTIVE SHEET

CROSS-REFERENCE TO RELATED APPLICATION

This application is a continuation of pending International Application No. PCT/KR2008/006501, entitled "Adhesive Composition, and Optical Member, Surface Protective Sheet," which was filed on Nov. 4, 2008, the entire contents of which are hereby incorporated by reference.

BACKGROUND

1. Field

The present invention relates to adhesive compositions, optical members, and surface protective sheet.

2. Related Art

As in cathode ray tubes, a surface of a flat display panel also tends to be charged with static electricity. When the surface of the flat display panel is charged with the static electricity, dust in air can often be attracted to a display plane of the panel. Further, the static electricity can have a negative influence on a display circuit of a substrate constituting the flat display panel or on orientation of liquid crystal molecules in the panel, thereby causing display malfunction.

When examining display performance of the flat display panel, it is necessary to remove a surface protective film which can cause optical obstruction. To remove the surface protective film, the surface protective film is peeled off at a rate of about 10 m/min to reduce a process time. Such a relatively high rate of peeling off the surface protective film causes the display plane to be easily charged with the static electricity.

SUMMARY

It is a feature of an embodiment to provide an adhesive composition, which may have a short aging time resulting in high productivity and permit the formation of an adhesive layer exhibiting good antistatic performance, and an optical member and surface protective film comprising the same.

It is another feature of an embodiment to provide an optical member that includes the adhesive composition coated on one or both sides of an optical sheet, thereby providing a short aging time resulting in high productivity, while exhibiting good antistatic performance.

It is another feature of an embodiment to provide a surface protection sheet that includes a protective film and an adhesive layer comprising the adhesive composition on one or both sides of the protective film, thereby providing a short aging time resulting in high productivity, while exhibiting good antistatic performance.

At least one of the above and other features and advantages may be realized by providing an adhesive composition, including: a copolymer (A), the copolymer (A) being a copolymer of: a hydroxyl group-containing (meth)acrylamide (a1), the hydroxyl group-containing (meth)acrylamide (a1) including at least one of a hydroxyl group-containing acrylamide and a hydroxyl group-containing methacrylamide, and a (meth)acrylate (a2), the (meth)acrylate (a2) including at least one of an acrylic ester and a methacrylic ester; and an antistatic agent (B), the antistatic agent (B) including an ionic compound.

The hydroxyl group-containing (meth)acrylamide (a1) may be represented by the following formula: $H_2C=C(R1)$ ACONHCH$_2$CH$_2$OH, in which R1 is H or CH$_3$, A is a linking group, the linking group being (COOCH$_2$CH$_2$)$_n$, COOCH$_2$CH$_2$OOC—CH$_2$CH$_2$, a single bond, or Compound 1 represented by Chemical Formula 1:

[Chemical Formula 1]

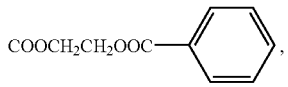

and n is 1 or 2.

The adhesive composition may be for an optical member, and the copolymer (A) may include about 0.1 to about 5% by weight of the hydroxyl group-containing (meth)acrylamide (a1) based on a total weight of the copolymer (A).

The adhesive composition may be for a surface protection sheet, and the copolymer (A) may include about 0.1 to about 10% by weight of the hydroxyl group-containing (meth)acrylamide (a1) based on a total weight of the copolymer (A).

The copolymer (A) may include about 50 to about 99.1% by weight of the (meth)acrylamide (a2) based on a total weight of the copolymer (A).

The (meth)acrylamide (a2) may include at least one of methyl (meth)acrylate, ethyl (meth)acrylate, n-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, methoxyethyl (meth)acrylate, ethoxyethyl (meth)acrylate, butoxyethyl (meth)acrylate, cyclohexyl (meth)acrylate, t-butylcyclohexyl (meth)acrylate, phenoxyethyl (meth)acrylate, nonylphenoxy polyethylene glycol (meth)acrylate, benzyl (meth)acrylate, isobornyl (meth)acrylate, and tetrahydrofurfuryl (meth)acrylate.

The adhesive composition may be for an optical member, and the copolymer (A) may include about 80 to about 99.89% by weight of n-butyl acrylate as the (meth)acrylamide (a2) based on a total weight of the copolymer (A).

The adhesive composition may be for an optical member, and the copolymer (A) may include about 0.1 to about 5% by weight of hydroxyethylacrylamide as the hydroxyl group-containing (meth)acrylamide (a1) based on a total weight of the copolymer (A).

The copolymer may be for a surface protective film, and the copolymer (A) may include about 50 to about 99.89% by weight of 2-ethylhexylacrylate as the (meth)acrylamide (a2) based on a total weight of the copolymer (A).

The adhesive composition may be for an optical member, and the base polymer (A) may have a polystyrene conversion weight-average molecular weight of about 1,000,000 to about 2,000,000 as determined by gel permeation chromatography.

The adhesive composition may be for a surface protection sheet, and the base polymer (A) may have a polystyrene conversion weight-average molecular weight of about 300,000 to about 1,000,000 as determined by gel permeation chromatography.

The base polymer (A) may have a glass transition temperature (Tg) of about 0° C. or less.

The ionic compound may include at least one of an imidazolium salt, a pyridinium salt, an alkyl ammonium salt, an alkyl pyrrolidium salt, and an alkyl phosphonium salt.

The copolymer (A) may be crosslinked.

The adhesive composition may be for an optical member, and the copolymer (A) may have a gel fraction of about 50 to about 80% as a crosslinking degree.

The adhesive composition may be for a surface protection sheet, and the copolymer (A) may have a gel fraction of about 90 to about 100% as a crosslinking degree.

The adhesive composition may include about 0.01 to about 2.0% by weight of the antistatic agent (B).

At least one of the above and other features and advantages may also be realized by providing an optical member, including an optical sheet, and an adhesive layer, the adhesive layer being formed by coating the adhesive composition according to an embodiment on one or both sides of the optical sheet.

The adhesive layer may have a sheet resistance of about $1 \times 10^8$ to about $1 \times 10^{11}$ $\Omega/cm^2$.

At least one of the above and other features and advantages may also be realized by providing a surface protection sheet, including a protective film, and an adhesive layer formed on one or both sides of the protective film, the adhesive layer including the adhesive composition according to an embodiment.

The adhesive layer may have a sheet resistance of about $1 \times 10^8$ to about $1 \times 10^{11}$ $\Omega/cm^2$.

BRIEF DESCRIPTION OF THE DRAWINGS

The above and other features and advantages will become more apparent to those of skill in the art by describing in detail example embodiments with reference to the attached drawings, in which:

FIGS. 1 through 8 illustrate Tables 1 through 8, respectively.

DETAILED DESCRIPTION

Japanese Patent Application No. 2007-302702, filed on Nov. 22, 2007, in the Japanese Patent Office, and entitled: "Adhesive Composition, and Optical Member, Surface Protective Sheet," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Adhesive Composition

According to an embodiment, an adhesive composition includes a copolymer (A) and an antistatic agent (B). The copolymer (A) may be formed by copolymerization of a hydroxyl group-containing (meth)acrylamide (a1) and a (meth)acrylate (a2). The hydroxyl group-containing (meth)acrylamide (a1) may include a hydroxyl group-containing acrylamide, a hydroxyl group-containing methacrylamide, or a combinations thereof. The (meth)acrylate (a2) may include an acrylic ester, a methacrylic ester, or a combination thereof. The antistatic agent (B) may include an ionic compound.

The base polymer (A), i.e., the copolymer (A), may be crosslinked by a crosslinking agent. In an example embodiment, the antistatic agent may be added to the base polymer (A) so that an adhesive layer formed by coating the adhesive composition on a substrate such as optical sheets or protective films has a surface resistance of, for example, about $1 \times 10^8$ to about $1 \times 10^{11}$ $\Omega/cm^2$.

Base Polymer

According to this embodiment, the base polymer may be formed by copolymerization of: (hereinafter, referred to as the "hydroxyl group-containing (meth)acrylamide (a1)") hydroxyl group-containing acrylamides, hydroxyl group-containing methacrylamides, or combinations thereof; and (hereinafter, referred to as the "(meth)acrylate (a2)") acrylic esters, methacrylic esters, or combinations thereof.

When using the adhesive composition according to this embodiment for an optical member, the base polymer (A) may contain about 0.1 to about 5 wt. % of the hydroxyl group-containing (meth)acrylamide (a1) based on a total weight of the base polymer (A). If the amount of the hydroxyl group-containing (meth)acrylamide (a1) is less than about 0.1 wt. % in the base polymer (A), there is a possibility of insufficiently enhancing the antistatic performance. If the amount of the hydroxyl group-containing (meth)acrylamide (a1) exceeds about 0.5 wt. % in the base polymer (A), there is a possibility of providing insufficient durability.

Further, when using the adhesive composition according to this embodiment for a surface protection sheet, the base polymer (A) may contain about 0.1 to about 10 wt. % of the hydroxyl group-containing (meth)acrylamide (a1) based on a total weight of the base polymer (A).

If the amount of the hydroxyl group-containing (meth)acrylamide (a1) is less than about 0.1 wt. % in the base polymer (A), there is a possibility of insufficiently enhancing the antistatic performance. If the amount of the hydroxyl group-containing (meth)acrylamide (a1) exceeds about 10 wt. % in the base polymer (A), there is a possibility of providing insufficient adhesion to the protective film or insufficient transparency to the adhesive layer.

Examples of the hydroxyl group-containing (meth)acrylamide (a1) include $H_2C=C(R1)ACONHCH_2CH_2OH$ (where R1 represents H or $CH_3$, and A represents a linking group). The linking group may be, e.g., a single bond. The linking group may be, e.g., $(COOCH_2CH_2)_n$ or $COOCH_2CH_2OOC-CH_2CH_2$, which may be bonded via terminal carbons thereof, and in which n may be 1 or 2. The linking group may be, e.g., Compound 1 represented by the following Chemical Formula 1, which may be bonded via a terminal carbon and a carbon of the aromatic ring.

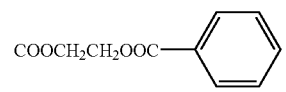

Chemical Formula 1

The hydroxyl group-containing (meth)acrylamide (a1) may include hydroxyethyl acrylamide (HEAA) and the like.

The (meth)acrylate (a2) may be a main element of the base polymer (A), e.g., it may be present in an amount of about 50 to about 99.1 wt. % based on a total amount of the base polymer (A). The base polymer (A) may include a single (meth)acrylate (a2), or may include two or more (meth)acrylates (a2).

Examples of the (meth)acrylate (a2) include methyl (meth)acrylate, ethyl (meth)acrylate, n-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, methoxyethyl (meth)acrylate, ethoxyethyl (meth)acrylate, butoxyethyl (meth)acrylate, cyclohexyl (meth)acrylate, t-butylcyclohexyl (meth)acrylate, phenoxyethyl (meth)acrylate, nonylphenoxy polyethylene glycol (meth)acrylate, benzyl (meth)acrylate, isobornyl (meth)acrylate, tetrahydrofurfuryl (meth)acrylate, and the like.

It is desirable that the base polymer (A) of the adhesive composition for the optical member contain n-butyl acrylate as a main element of the (meth)acrylate in order to realize high adhesion.

Further, it is desirable that the base polymer (A) of the adhesive composition for the surface protection sheet contain 2-ethylhexyl acrylate as a main element of the (meth)acrylate (a2) to exhibit a degree of adhesion that allows easy separation of the surface protection sheet.

The base polymer (A) may be an acrylate polymer that includes one or more of the (meth)acrylates (a2) as main elements, since the acrylate polymer has good compatibility with ionic compounds and provides good adhesive properties.

When using the adhesive composition of this embodiment for the optical member, the base polymer (A) may have a weight-average molecular weight of about 1,000,000 to about 2,000,000. When the weight-average molecular weight of the base polymer (A) is in the range of about 1,000,000 to about 2,000,000, the adhesive composition may provide a sufficient adhesive force as a composition constituting an adhesive layer of the optical member.

The weight-average molecular weight of the base polymer (A) can be obtained by polystyrene conversion and gel permeation chromatography.

Further, the base polymer (A) may have a glass transition temperature Tg of about 0° C. or less. In an implementation, the base polymer (A) may have a glass transition temperature Tg of about −100 to about −5° C., and more advantageously a glass transition temperature Tg of about −80 to about −10° C. If the glass transition temperature Tg is less than or equal to about 0° C., the adhesive composition may provide a higher adhesive force when containing an ionic compound.

In another implementation, the base polymer (A) may contain other components besides, i.e., in addition to or instead of, the hydroxyl group-containing (meth)acrylamide (a1) and the (meth)acrylate (a2).

The other components of the base polymer may include components for enhancing cohesive force and thermal resistance, such as sulfonic acid group-containing monomers, phosphoric acid group-containing monomers, cyano group-containing monomers, vinyl esters, aromatic vinyl compounds, and the like, or components having functional groups capable of enhancing the adhesive force or capable of acting as a crosslink starter, such as carboxyl group-containing monomers, acid anhydride group-containing monomers, hydroxyl group-containing monomers, amide group-containing monomers, amino group-containing monomers, epoxy group-containing monomers, N-acryloyl morpholine, vinyl ethers, and the like. The other components may be used alone or in combination of two or more kinds of components.

Examples of the sulfonic acid group-containing monomers may include styrene sulfonic acid, allyl sulfonic acid, 2-(meth)acrylamido-2-methylpropane sulfonic acid, methacrylamidopropane sulfonic acid, sulfopropyl (meth)acrylate, (meth)acryloyloxynaphthalene sulfonic acid, and the like.

An example of the phosphoric acid group-containing monomers may include 2-hydroxyethyl acryloyl phosphate.

An example of the cyano group-containing monomers may include acrylonitrile.

An example of the vinyl esters may include vinyl acetate.

An example of the aromatic vinyl compounds may include styrene.

Examples of the carboxyl group-containing monomers may include (meth)acrylic acid, carboxyethyl(meth)acrylate, carboxypentyl(meth)acrylate, itaconic acid, maleic acid, crotonic acid, 2-carboxyethyl acrylate, and the like.

Examples of the acid anhydride group-containing monomers include maleic anhydride, itaconic anhydride, and the like.

Examples of the hydroxyl group-containing monomers may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol (meth)acrylamide, vinyl alcohol, allyl alcohol, 2-hydroxyethyl vinyl ether, 4-hydroxybutyl vinyl ether, diethyleneglycol monovinyl ether, and the like.

Examples of the amide group-containing monomers may include acrylamide, diethyl acrylamide, and the like.

Examples of the amino group-containing monomers may include N,N-dimethylaminoethyl (meth)acrylate, N,N-dimethylaminopropyl (meth)acrylate, and the like.

Examples of the epoxy group-containing monomers may include glycidyl (meth)acrylate, allylglycidyl ether, and the like.

An example of the vinyl ethers may include vinyl ethyl ether.

Examples of a method of polymerizing the base polymer (A) may include solution polymerization, emulsion polymerization, bulk polymerization, suspension polymerization, and the like.

For the polymerization of the base polymer (A), a polymerization initiator may be used. Examples of the polymerization initiator may include peroxides such as benzoyl peroxide, lauroyl peroxide, and the like; and azobis compounds such as azobisisobutyronitrile (AIBN), azobisvaleronitrile, and the like.

Crosslinking Agent

In an example embodiment, the adhesive composition may be crosslinked, which may provide an adhesive layer having excellent thermal resistance. The base polymer (A) may be crosslinked, e.g., at the acrylic polymer (a2), which may be the main element of the base polymer (A).

Crosslinking may be conducted by a method using a crosslinking agent in which a compound containing a group is added to react with a carboxyl group, a hydroxyl group, an amino group, an amide group, or the like contained as a crosslinking starter in an acrylic polymer such as one containing isocyanate compounds, epoxy compounds, aziridine compounds, and/or metal chelate compounds.

Examples of the isocyanate compounds may include aromatic diisocyanates such as tolylene diisocyanate and xylene diisocyanate; alicyclic diisocyanates such as isophoron diisocyanate; and aliphatic isocyanates, such as hexamethylene diisocyanate. In particular, the isocyanate compounds or the epoxy compounds may be used in view of their cohesive properties. These compounds may be used alone or in a combination of at least two kinds.

More specifically, examples of the isocyanate compounds may include: low aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic isocyanates such as 2,4-tolylene diisocyanate, 4,4'-diphenylmethane diisocyanate, and xylylene diisocyanate; and isocyanate adducts such as a trimethylolpropane/tolylene diisocyanate trimer adduct (trademark: Coronate L), a trimethylolpropane/hexamethylene diisocyanate trimer adduct (trademark: Coronate HL), and an isocyanurate product of hexamethylene diisocyanate (trademark: Coronate HX) (all manufactured by Nippon Polyurethane Industry Co., Ltd.).

Examples of the epoxy compounds may include N,N,N',N'-tetraglycidyl-m-xylenediamine (trademark: TETRAD-X) and 1,3-bis(N,N-diglycidylaminomethyl)cyclohexane (trademark: TETRAD-C) (all manufactured by Mitsubishi Gas Chemical Co., Inc.).

These crosslinking agents may be used alone or in a combination of two or more kinds. The content of the crosslinking agent may be selected according to balance with a crosslinking target base polymer, and according to applications of the optical member. To achieve sufficient thermal resistance by the cohesive force of the acrylate adhesive agent, the content of the crosslinking agent may be about 0.01 parts by weight or more based on 100 parts by weight of the base polymer. Further, in view of flexibility and adhesion, the content of the crosslinking agent may be about 0.05 parts by weight or less based on 100 parts by weight of the base polymer.

When the adhesive composition according to this embodiment is used for the optical member, the base polymer (A) of the adhesive composition may have a gel fraction of about 50 to about 80% as a crosslinking degree, and more advantageously a gel fraction of about 70% as a crosslinking degree, which may help increase the adhesive force of the adhesive composition.

When the adhesive composition according to this embodiment is used for the surface protection sheet, the base polymer (A) of the adhesive composition may have a gel fraction of about 90 to about 100% as a crosslinking degree, whereby the adhesive force of the adhesive composition may be decreased so as to facilitate the separation of the surface protection sheet.

The gel fraction may be obtained from an initial mass of the adhesive composition (before digestion) and a mass thereof after immersing and drying in the case where the adhesive composition is immersed in ethyl acetate at 25° C. for 1 day, as calculated by Equation: Gel Fraction=[Mass after immersing and drying/Initial Mass]×100.

Antistatic Agent

The antistatic agent may include an ionic compound.

The ionic compound may be selected to have compatibility with the base polymer and an organic solvent used in the preparation of the adhesive composition, while allowing transparency of the adhesive composition to be maintained when the ionic compound is added to the base polymer. Further, the ionic compound may be selected to have a surface resistance of about $1 \times 10^{11}$ $\Omega/cm^2$ or less when the adhesive composition is applied to a substrate such as the optical sheet or the protective film.

The ionic compound may include one or more of an imidazolium salt, a pyridinium salt, an alkyl ammonium salt, an alkyl pyrrolidium salt, and an alkyl phosphonium salt.

Examples of the imidazolium salt include 1,3-dimethylimidazolium chloride, 1-butyl-2,3-dimethylimidazolium chloride, 1-butyl-3-methylimidazolium bromide, 1-butyl-3-methylimidazolium chloride, 1-butyl-3-methylimidazolium methane sulfonate, 1-butyl-1-(3,3,4,4,5,5,6,6,7,7,8,8,8-tridecafluorooctyl)-imidazolium hexafluorophosphate, 1-ethyl-3-methylimidazolium bromide, 1-ethyl-3-methylimidazolium chloride, 1-ethyl-3-methylimidazolium hexafluorophosphate, 1-ethyl-3-methylimidazolium iodide, 1-ethyl-2,3-dimethylimidazolium chloride, 1-methylimidazolium chloride, 1,2,3-trimethylimidazolium methyl sulfate, 1-methyl-3-(3,3,4,4,5,5,6,6,7,7,8,8,8-tridecafluorooctyl)-imidazolium hexafluorophosphate, 1-aryl-3-methylimidazolium chloride, 1-benzyl-3-methylimidazolium chloride, 1-benzyl-3-methylimidazolium hexafluorophosphate, 1-benzyl-3-methylimidazolium tetrafluorophosphate, and the like.

Examples of the pyridinium salt include 1-butyl-3-methylpyridinium bromide, 1-butyl-4-methylpyridinium bromide, 1-butyl-4-methylpyridinium chloride, 1-butylpyridinium bromide, 1-butylpyridinium chloride, 1-butylpyridinium hexafluorophosphate, 1-ethylpyridinium bromide, 1-ethylpyridinium chloride, and the like.

Examples of the alkyl ammonium salt include cyclohexyltrimethylammonium bis(trifluoromethylsulfonyl)imide, tetra-n-butylammonium chloride, tetrabutylammonium bromide, tributylmethylammonium methylsulfate, tetrabutylammonium bis(trifluoromethylsulfonyl)imide, tetraethylammonium trifluoromethanesulfonate, tetrabutylammonium benzoate, tetrabutylammonium methanesulfate, tetrabutylammonium nonafluorobutanesulfonate, tetra-n-butylammonium hexafluorophosphate, tetrabutylammonium trifluoroacetate, tetrahexylammonium tetrafluoroborate, tetrahexylammonium bromide, tetrahexylammonium iodide, tetraoctylammonium chloride, tetraoctylammonium bromide, tetraheptylammonium bromide, tetrapentylammonium bromide, n-hexadecyltrimethylammonium hexafluorophosphate, and the like.

Examples of the alkyl pyrrolidium salt include 1-butyl-3-methylpyrrolidium bromide, 1-butyl-1-methylpyrrolidium chloride, 1-butyl-1-methylpyrrolidium tetrafluoroborate, and the like.

Examples of the alkyl phosphonium salt include tetrabutylphosphonium bromide, tetrabutylphosphonium chloride, tetrabutylphosphonium tetrafluoroborate, tetrabutylphosphonium methanesulfonate, tetrabutylphosphonium p-toluenesulfonate, tributylhexadecylphosphonium bromide, and the like.

For the ionic compound, a nitrogen-containing onium salt, a sulfur-containing onium salt, or a phosphorous-containing onium salt may be used.

Examples may include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl) imide, 1-hexylpyridinium tetrafluoroborate, 2-methyl-1-pyrrolin tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl) ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylamonium trifluoromethanesulfonate, glycidyltrimethylamonium bis(trifluoromethanesulfonyl)imide, glycidyltrimethylammonium bis(pentafluoroethanesulfonyl) imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl) trifluoroacetamide, diallyldimethylammonium (trifluoromethanesulfonyl)trifluoroacetamide, glycidyltrimethylammonium(trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl) imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylamonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl) imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, and N-methyl-N-ethyl-N-propyl-N-pentylammonium bis(trifluoromethanesulfonyl)imide, and the like.

Ingredient Ratio of Base Polymer (A) and Antistatic Agent (B)

An ingredient ratio of the antistatic agent (B) with respect to a total amount of the base polymer (A) and antistatic agent (B) may be about 0.01 wt. % to about 2 wt. %. If the ingredient ratio is less than about 0.01 wt. %, a sufficient antistatic effect may not be obtained, whereas if the ingredient ratio exceeds about 2 wt. %, there is a possibility of contamination of an attachment target.

Other Additives

The adhesive composition may further contain other additives for providing adhesive properties. For example, a surface lubricant, a leveling agent, an antioxidant, an anti-corrosion agent, a light stabilizer, an ultraviolet absorbing agent, a polymerization inhibitor, a silane coupling agent, an inorganic or organic filler, a metal powder, a pigment powder, or a particle or foil-shaped material may be appropriately added according to intended use.

Preparation Method of Adhesive Composition

Examples of a method of preparing the adhesive composition according to an embodiment may include the following two methods.

In one method, a variety of monomers, which are the raw materials of the base polymer (A), are mixed with an organic solvent having a boiling point of 120° C. or less, such as ethyl acetate, toluene, acetone, hexane, ketones, and alcohols, and are polymerized by the addition of a polymerization initiator, thereby preparing the base polymer. The base polymer may be, e.g., a random copolymer. The obtained base polymer may be in a dissolved state or expanded in the organic solvent.

Next, an antistatic agent, which may include one or more ionic compounds, is added to the organic solvent containing the base polymer to be mixed with the base polymer.

Subsequently, a crosslinking agent is added to crosslink the base polymer, and additives such as the silane coupling agent and the like are further added as needed. As a result, the adhesive composition may be prepared.

The adhesive composition obtained is applied to a substrate such as the optical sheet or the surface protective film, and dried, thereby forming an adhesive layer on the substrate.

In another method, a variety of monomers, which are the raw materials of the base polymer (A), are mixed with an organic solvent such as ethyl acetate while adding the antistatic agent consisting of the ionic compounds thereto at the same time, and are then polymerized by the addition of the polymerization initiator, thereby preparing the base polymer containing the antistatic agent. As in the above method, the base polymer obtained may be in a dissolved state or expanded in the organic solvent.

Next, the crosslinking agent is added to the organic solvent containing the base polymer and the antistatic agent to crosslink the base polymer, and the additives such as the silane coupling agent and the like are further added as needed. As a result, the adhesive composition may be prepared.

As in the above method, the obtained adhesive composition is applied to the substrate such as the optical sheet or the surface protective film and dried, thereby, forming the adhesive layer on the substrate.

As described above, when preparing the adhesive composition according to this embodiment, the antistatic agent may be added after the preparation of the base polymer, or may be added while preparing the base polymer. In order to uniformly add the antistatic agent to the base polymer, the antistatic agent is advantageously soluble in the organic solvent such as ethyl acetate.

Optical Member

An optical member according to an embodiment may be formed by coating the adhesive composition according to the embodiment of the invention on one or both sides of an optical sheet. For the optical member according to this embodiment, an adhesive layer containing the adhesive composition may be formed to a thickness of about 3 to about 200 μm, and advantageously about 10 to about 100 μm, on one or both sides of the optical sheet. The formation of the adhesive layer may be achieved by directly coating the adhesive composition on the optical sheet or by coating the adhesive composition on a separate substrate (such as a separation liner or the like) and transferring the coated adhesive composition to the optical sheet.

As a method of forming the adhesive layer, any known method used for preparing an adhesive tape may be used. Specifically, examples of the method include roll coating, gravure coating, reverse coating, roll brushing, spray coating, air-knife coating, die-coat methods, and the like.

According this embodiment, a variety of optical sheets for use in manufacture of a variety of displays may be used without being limited to a specific optical sheet. Examples of the optical sheet include a polarizer, a phase difference plate, a brightness enhancing plate, and a glare reducing sheet. Further, the optical sheet according to this embodiment may be obtained by stacking two or more optical materials, such as a stack of the polarizer and the phase difference plate, a stack of the polarizers, a stack of phase difference plates, a stack of the polarizer and the brightness enhancing plate or the glare reducing sheet, and the like.

The adhesive layer (adhesive composition) formed on the optical sheet may have an adhesive force of about 1 (N/25 mm) to about 15 (N/25 mm), and more advantageously an adhesive force of about 5 (N/25 mm) to about 10 (N/25 mm). When the adhesive force is in the range of 1 (N/25 mm) to about 15 (N/25 mm), it will be sufficient for the adhesive layer of the optical member. The adhesive force can be measured according to JIS Z0237, which regulates a method for testing an adhesive tape and an adhesive sheet. In more detail, an optical member having an adhesive layer may be evaluated for adhesive force by the following process: the optical member may be left for seven days at 23° C. under a relative humidity of 50%, cut into a width of 25 mm, autoclaved at 50° C. and at 5 kg/cm²×20 min in a state of being adhered to, for example, the polarizer; and measured for adhesive force at 23° C. under a relative humidity of 50% using a tensile tester at a peeling angle of 180 degrees and at a peeling rate of 0.3 m/min according to JIS Z0237.

Surface Protection Sheet

A surface protection sheet for an optical member according to an embodiment may include a protective film and an adhesive layer formed on one or both sides of the protective film, in which the adhesive layer includes the adhesive composition according to an embodiment. The adhesive layer of the adhesive composition may be formed to a thickness of about 3 to about 200 μm, and advantageously about 10 to about 100 μm, on one or both sides of the protective film.

Examples of the protective film may include resin films, such as polyethylene terephthalate, polyethylene, polypropylene, ethylene-acetate vinyl copolymer, polyester, polyvinyl chloride, polycarbonate, polyamide, polystyrene films, and combinations thereof. Advantageously, a polyethylene terephthalate film may be used. The protective film may have a thickness of, for example, about 15 to about 20 μm.

The formation of the adhesive layer on the protective film may be achieved by directly coating the adhesive composition on the protective film, or by coating the adhesive composition on a separate substrate (such as a separation liner or the like) and transferring the coated adhesive composition to the protective film.

As a method of forming the adhesive layer, any known method used for preparing an adhesive tape may be used. Specifically, examples of the method include roll coating, gravure coating, reverse coating, roll brushing, spray coating, air-knife coating, die-coat methods, and the like.

The surface protection sheet according to this embodiment may be used to protect an optical member attached to a typical flat display panel such as a liquid display panel, a plasma display panel, and the like.

The surface protection sheet according to this embodiment may be used not only in the case where the optical member is individually distributed in the market, but also in the case where the optical member is distributed in the market in a state of being attached to the flat display panel.

The adhesive layer (adhesive composition) formed on the protective film may have an adhesive force of about 0.05 (N/25 mm) to about 0.2 (N/25 mm), and more advantageously an adhesive force of about 0.1 (N/25 mm). When the adhesive force is in the range of about 0.05 to about 0.2 (N/25 mm), the surface protection sheet may be relatively easily peeled from the optical member, such as a polarizer, at a rate of, for example, about 10 m/min. The adhesive force may be measured according to JIS Z0237, which is described above.

The adhesive composition according to this embodiment may include the copolymer (A), which may be formed by the copolymerization of the hydroxyl group-containing (meth) acrylamide (a1) (which may include a hydroxyl group-containing acrylamide, a hydroxyl group-containing methacrylamide, and combinations thereof) and the (meth)acrylate (a2) (which may include an acrylic ester, a methacrylic ester, and combinations thereof); and an antistatic agent (B) including an ionic compound. The adhesive composition according to this embodiment may have a short aging time resulting in high productivity and may enable the formation of an adhesive layer exhibiting good antistatic performance.

Specifically, when the adhesive composition of this embodiment is applied to the substrate such as the optical sheet or the protective film to form an adhesive layer thereon, the adhesive layer may have a sheet resistance of about $1 \times 10^8$ to about $1 \times 10^{11}$ ($\Omega/cm^2$), and may exhibit good antistatic performance.

Without being bound by theory, it is believed that, in the adhesive composition, the improvement of the antistatic performance is achieved as movement of the ionic compound in the adhesive layer is facilitated by the presence of lone electron pair of nitrogen atoms contained in the hydroxyl group-containing acrylamide and/or the methacrylamide. Also, the short aging time of the adhesive composition of this embodiment is presumably attributed to activation of the terminal hydroxyl group of the copolymer by the hydroxyl group-containing acrylamide and/or the methacrylamide, thereby increasing reactivity of the copolymer.

The adhesive composition of this embodiment may be very transparent where the base polymer contains at least one kind of (meth)acrylate as a main element.

When the base polymer of the adhesive composition has a weight-average molecular weight of about 1,000,000 to about 2,000,000 and a gel fraction of about 50 to about 80%, the adhesive composition may have a high adhesive force, and thus may be used to form the adhesive layer of the optical member.

When the base polymer of the adhesive composition has a weight-average molecular weight of about 300,000 to about 1,000,000 and a gel fraction of about 90 to about 100%, an adhesive layer on a surface protection sheet formed by coating the adhesive composition may exhibit a weak adhesive force. In this case, the adhesive layer may be relatively easily peeled off, for example, at a rate of 10 m/min, from a display surface of a polarizer on a flat display panel.

EXAMPLES

Hereinafter, embodiments will be described with reference to Examples 1 to 16.

Adhesive compositions according to Examples 1 to 16 were prepared and applied to polarizers, thereby producing optical members of Examples 1 to 16. Then, the optical members were tested for performance. A detailed description follows.

(Preparation of Copolymer Composition According to Example 1)

1 part by weight of hydroxyethylacrylamide as the (meth) acrylamide having a hydroxyl group, 98.99 parts by weight of butyl acrylate, and 120 parts by weight of ethyl acetate as a solvent were introduced into a flask equipped with a reflux condenser and an agitator, and were heated to 65° C. while conducting nitrogen substitution. Then, 0.04 parts by weight of AIBN as a polymerization initiator was added thereto, followed by polymerization for six hours at 65° C. When the polymerization was completed, 0.01 parts by weight of 1-hexyl-3-methylimidazolium hexafluorophosphate as an ionic compound was added, and 280 parts by weight of ethyl acetate was further added to adjust viscosity, followed by cooling to room temperature, thereby producing a copolymer composition solution containing the adhesive composition of Example 1.

The adhesive composition in the copolymer composition solution had a concentration of 20 wt. %, and the copolymer composition solution had a viscosity of 4,500 mPa·s. Table 1 shows an ingredient ratio of the adhesive composition, a concentration of the adhesive composition in the copolymer composition solution, and a viscosity of the copolymer composition solution.

Further, the weight-average molecular weight of the base polymer was measured by Gel Permeation Chromatography (GPC). Results are shown in Table 1.

(Preparation of Copolymer Composition Solutions According to Examples 2 to 16)

Copolymer composition solutions containing adhesive compositions of Examples 2 to 16 were obtained by the same process as that of Example 1, except for the following: at least one of butylacrylate, 2-ethylhexyl acrylate, N,N-diethylacrylamide, 2-hydroxyethylacrylate, 4-hydroxybutylacrylate, acrylic acid and acryl amide with hydroxyethylacrylamide combined (not combined) therewith as the hydroxyl group-containing (meth)acrylamide was appropriately combined with ethyl acetate as a solvent, while combining (not combining) one of 1-hexyl-3-methylimidazolium hexafluorophosphate, N-methyl-N-propylpiperidinium bis(trifluoromethanesulfonyl)imide, 1-ethylpyridinium bromide, 1-butyl-3-methylpyridinium trifluoromethanesulfonate, and 1-butyl-3-methylpyridinium bis(trifluoromethanesulfonyl) imide as an ionic compound therewith at the same time. Tables 1 and 2 show the ingredient ratios of the adhesive compositions of Examples 2 to 16, the viscosity of each copolymer composition solution, the concentration of the adhesive composition in each copolymer composition solution, and the average weight molecular weight of the base polymer.

(Preparation of Optical Members of Examples 1 to 16)

With respect to 100 parts by weight of the adhesive composition in each of the copolymer composition solutions of Examples 1 to 16 listed in Tables 1 and 2, trimethylolpropane/tolylene diisocyanate (Trademark: Coronate L, manufactured by Nippon Polyurethane Industry Co., Ltd) as a crosslinking agent (B) and 3-glycidoxypropyltrimethoxysilane (Trademark: Shin-Etsu Silicone KBM-403, manufactured by Shin-Etsu Chemical Industry Co., Ltd.) as a silane coupling agent (C) were added at the ratios listed in Tables 3 and 4 and sufficiently mixed to prepare adhesive composition solutions. Each of the adhesive composition solutions obtained was applied to a separable PET film (Trademark: MRF 38, manufactured by Mitsubishi Polyester Film Co., Ltd.) to a thickness of 25 μm after drying, and dried at 90° C. for 3 minutes to form an adhesive layer consisting of the adhesive composition. Then, the adhesive layers and the separable PET films were attached to polarizers (Trademark: MLPH, manufactured by Migwan Imaging Co., Ltd.), thereby producing optical members of Examples 1 to 16, respectively.

Performance of each optical member was tested for surface resistance, metal corrosiveness, light leakage, durability, viscosity, adhesion to substrate, contamination of attachment target, low temperature stability, and reworkability. The performance test was carried out as described below.

Further, the concentration of the adhesive composition in each adhesive composition solution and the viscosity of each adhesive composition solution were measured. Furthermore, the gel fraction and the period for obtaining a stabilized gel fraction were evaluated. Results are shown in Tables 3 and 4.

Gel Fraction

Test samples 1 to 16 were prepared with polyester films having been peeled off, instead of the polarizers used in the preparation of the optical members of Examples 1 to 16, and left at 23° C. under a relative humidity of 50%, followed by measuring the gel fractions of the test samples after 1, 3, 5, 7, 10, and 15 days from application.

The gel fraction is calculated by Equation: Gel fraction (wt. %)=[(W3−W2)/W1]×100

In this equation, W1 indicates the weight (g) of an adhesive layer obtained from a test sample. W2 indicates the weight (g) of a stainless steel wire mesh mentioned below. W3 indicates the total weight (g) of the stainless steel wire mesh and a layer on the wire mesh (remnants after filtering), which was obtained by the following process: 30 g of ethyl acetate was added to a sample container having the adhesive layer obtained from the test sample, and, after the adhesive layer was immersed therein overnight, the contents in the sample container were filtered using a 200-mesh stainless steel wire mesh, and dried at 90° C. for one hour.

Period for Obtaining a Stabilized Gel Fraction

As described above, the gel fraction of each test sample was measured after a predetermined period from the application, and the period for which the gel fraction became steady was defined as a period for obtaining a stabilized gel fraction, or a gel fraction stabilizing period.

<Method of Performance Test>

Surface Resistance

The adhesive layers of the optical members, which had been left at 23° C. under a relative humidity of 50% for seven days, were measured for surface resistance by a micro-electrometer (available from Kawaguchi Denki Manufacturing Co., Ltd.) at 23° C. under a relative humidity of 50%.

Metal Corrosiveness

An aluminum foil was attached to the adhesive layer of each optical member, which had been left at 23° C. under a relative humidity of 50% for seven days, and left at 60° C. under a relative humidity of 90% for two days. Then, the corrosiveness was observed. O represents the aluminum foil unchanged, and X represents the aluminum foil turned white.

Light Leakage

Each of the optical members, which had been left at 23° C. under a relative humidity of 50% for seven days, was cut into a piece of 120 mm (in the MD direction of the polarizer)×60 mm and a piece of 120 mm (in the TD direction of the polarizer)×60 mm, which in turn were attached to both sides of a glass substrate to overlap each other, followed by autoclaving at 50° C. and at 5 kg/cm²×20 min. Then, each sample was left at 80° C. for 120 hours and observed in appearance. The sample where light leakage was not detected is represented by O, and the sample where light leakage was detected is represented by X.

Durability

Each of the optical members, which had been left at 23° C. under a relative humidity of 50% for seven days, was cut into a piece of 120 mm (in the MD direction of the polarizers)×60 mm, and attached to a glass substrate, followed by autoclaving at 50° C. and at 5 kg/cm²×20 min. Then, the sample was left at 80° C. and at 60° C. under a relative humidity of 90% for 120 hours, and observed in appearance. The sample where foam, looseness, or peeling was not found is represented by O, and the sample where foam, looseness, or peeling was found is represented by X.

Adhesive Force and Adhesion to Substrate

Each optical member, which had been left at 23° C. under a relative humidity of 50% for seven days, was cut into a piece of a width of 25 mm and attached to a glass substrate, followed by autoclaving at 50° C. and at 5 kg/cm²×20 min. Then, the sample was measured for adhesive force at 23° C. under a relative humidity of 50% using a tensile tester at a peeling angle of 180 degrees and at a peeling rate of 0.3 m/min according to JIS Z0237, which regulates a method for testing an adhesive tape and an adhesive sheet. Further, the sample was also measured for adhesion to polarizer (substrate). The sample where the adhesive layer was not completely peeled from the polarizer is represented by O, and the sample where the adhesive layer was peeled from the polarizer is represented by X.

Contamination of Attachment Target

Before and after measuring the adhesive force, the contact angle was measured on the surface of the glass substrate. The sample where the contact angle of the glass substrate remained unchanged before and after the measurement is represented by O, and the sample where the contact angle of the glass substrate was changed before and after the measurement is represented by X. Meanwhile, the contact angle was measured according to JIS R3257, which regulates a method for measuring wettability of a glass substrate.

Low Temperature Stability

Each of the optical members, which had been left at 23° C. under a relative humidity of 50% for seven days, was cut into a piece of 120 mm (in the MD direction of the polarizers)×60 mm and attached to the glass substrate, followed by autoclaving at 50° C. and at 5 kg/cm²×20 min. Then, the sample was left at −40° C. for 120 hours and observed in appearance. The sample where foam, looseness, peeling, or a precipitate was not found is represented by O, while the sample where foam, looseness, peeling, or a precipitate was found is represented by X.

Reworkability

A peeled state was observed during measurement of the adhesive force. The sample where an interfacial fracture was observed is represented by O, and the sample where cohesive fracture and/or sticking to the glass substrate (attachment target) were observed is represented by X.

As shown in Table 3, the adhesive layers of Examples 1 to 10 had a surface resistance of $10^{11}$ $\Omega/cm^2$ or less, and exhibited good antistatic properties. Additionally, Examples 1 to 10 had a short gel fraction stabilizing period of 3 days. Further, the optical members of Examples 1 to 10 had a suitable adhesive force of 4 to about 8 N/25 mm. Moreover, the optical members of Examples 1 to 10 exhibited good properties in terms of all of metal corrosiveness, light leakage, durability, adhesion to substrate, contamination of attachment target, low temperature stability, and reworkability.

On the other hand, as shown in Table 4, since Example 11 contained neither the hydroxyl group-containing (meth)acrylamide nor the antistatic agent, it had a surface resistance of $10^{15}$ $\Omega/cm^2$, thereby showing that Example 11 had lower antistatic properties than Examples 1 to 10. Further, Example 11 had a gel fraction stabilizing period of 10 days, which was longer than that of Examples 1 to 10.

Further, since Example 12 did not contain the hydroxyl group-containing (meth)acrylamide, it had a gel fraction stabilizing period of 10 days; which was longer than that of Examples 1 to 10.

Further, since Example 13 had a lower amount of the hydroxyl group-containing (meth)acrylamide, it had a surface resistance of $10^{14}$ $\Omega/cm^2$, thereby showing that Example 13 had lower antistatic properties than Examples 1 to 10. Further, Example 13 was evaluated as X in terms of durability and reworkability.

Further, since Example 14 had a higher amount of the hydroxyl group-containing (meth)acrylamide, it was evaluated as X in terms of durability.

Further, since Example 15 had a lower amount of the hydroxyl group-containing (meth)acrylamide, it was evaluated as X in terms of durability and reworkability.

Further, since Example 16 contained N,N-diethyl acrylamide which is a monomer containing a nitrogen group without containing a hydroxyl group, it had a gel fraction stabilizing period of 10 days, which was longer than that of Examples 1 to 10, and was evaluated as X in terms of light leakage and durability.

Next, embodiments will be described with reference to Examples 17 to 32. First, adhesive compositions according to Examples 17 to 32 were prepared and applied to protective films, thereby producing surface protective films of Examples 17 to 32. Then, performance of the surface protective films was tested. A detailed description is as follows.

(Preparation of Copolymer Composition According to Example 17)

1 part by weight of hydroxyethylacrylamide as the (meth)acrylamide having a hydroxyl group, 40 parts by weight of butyl acrylate, 58.99 parts by weight of 2-ethylhexyl acrylate, and 150 parts by weight of ethyl acetate as a solvent were introduced into a flask equipped with a reflux condenser and an agitator, and were heated to 65° C. while conducting nitrogen substitution. Then, 0.1 parts by weight of AIBN was added thereto and 0.05 parts by weight of AIBN as a polymerization initiator was added again thereto 1 hour thereafter, followed by polymerization for six hours at 65° C. When the polymerization was completed, 0.01 parts by weight of 1-hexyl-3-methylimidazolium hexafluorophosphate was added as an ionic compound, and 36 parts by weight of ethyl acetate was further added to adjust the viscosity, followed by cooling to room temperature, thereby producing a copolymer composition solution containing the adhesive composition of Example 16.

The adhesive composition in the copolymer composition solution had a concentration of 35 wt. %, and the copolymer composition solution had a viscosity of 3,500 mPa·s. Table 5 shows an ingredient ratio of the adhesive composition, a concentration of the adhesive composition in the copolymer composition solution, and a viscosity of the copolymer composition solution.

Further, the weight-average molecular weight of the base polymer was measured by Gel Permeation Chromatography (GPC). Results are shown in Table 5.

(Preparation of Copolymer Composition Solutions According to Examples 18 to 32)

Copolymer composition solutions containing adhesive compositions of Examples 18 to 32 were obtained by the same process as that of Example 17, except for the following: at least one of butylacrylate, 2-ethylhexyl acrylate, 2-hydroxyethylacrylate, 4-hydroxybutylacrylate, acrylic acid and acryl amide with hydroxyethylacrylamide combined (not combined) therewith as the hydroxyl group-containing (meth)acrylamide was appropriately combined with ethyl acetate as a solvent, while combining (not combining) one of 1-hexyl-3-methylimidazolium hexafluorophosphate, N-methyl-N-propylpiperidinium bis(trifluoromethanesulfonyl) imide, 1-ethylpyridinium bromide and 1-butyl-3-methylpyridinium trifluoromethanesulfonate as the ionic compound therewith at the same time. Tables 5 and 6 show the ingredient ratios of the adhesive compositions of Examples 18 to 32, the viscosity of each copolymer composition solution, the concentration of the adhesive composition in each copolymer composition solution, and the average weight molecular weight of the base polymer.

(Preparation of Surface Protection Sheets of Examples 17 to 32)

With respect to 100 parts by weight of the adhesive composition in each of the copolymer composition solutions of Examples 17 to 32 listed in Tables 5 and 6, hexamethylenediisocyanate (isocyanate crosslinking agent, Coronate HX™, obtained from Nippon Polyurethane Industry Co., Ltd) as a crosslinking agent (B) was added at the ratios listed in Tables 7 and 8 and sufficiently mixed to prepare adhesive composition solutions. Each of the adhesive composition solutions obtained was applied to a separable PET film (Trademark: MRF 38, obtained from Mitsubishi Polyester Film Co., Ltd.) to a thickness of 25 μm after drying, and dried at 90° C. for 3 minutes to form an adhesive layer consisting of the adhesive composition. Then, the adhesive layers and the separable PET films were attached to PET protective films (Trademark: Lumirror S10#25, obtained from Tone Co., Ltd.), thereby producing surface protection sheets of Examples 17 to 32, respectively.

As in Example 1, performance of each surface protection sheet was tested for surface resistance, metal corrosiveness, contamination of attachment target, and low temperature stability. Here, the performance test was carried out by replacing the glass substrate with a polarizer as the attachment target. The performance test was carried out for adhesive force, adhesion to substrate, and transparency of adhesive layer as described below.

Further, as in Example 1, the concentration of the adhesive composition in each adhesive composition solution, and the viscosity, gel fraction, and period for obtaining a stabilized gel fraction for each adhesive composition solution were measured. Results are shown in Tables 7 and 8.

Adhesive Force and Adhesion to Substrate

Each of the optical members, which had been left at 23° C. under a relative humidity of 50% for seven days, was cut into a piece of a width of 25 mm and attached to the polarizer, followed by autoclaving at 50° C. and at 5 kg/cm$^2$×20 min. Then, the sample was measured for adhesive force at 23° C. under a relative humidity of 50% using a tensile tester at a peeling angle of 180 degrees and at a peeling rate of 0.3 m/min according to JIS Z0237 which regulates a method for testing an adhesive tape and an adhesive sheet. Further, the sample was also measured for adhesion to a protective film (substrate). The sample where the adhesive layer was not completely peeled from the protective film is represented by O, and the sample where the adhesive layer was peeled from the protective film is represented by X.

Transparency of Adhesive Layer

The transparency of each surface protection sheet, which had been left at 23° C. under a relative humidity of 50% for seven days, was confirmed by the naked eye. The sample where the adhesive layer exhibited good transparency is represented by O, and the sample where the adhesive layer had an unclear portion is represented by X.

As shown in Table 7, for the surface protection sheets of Examples 17 to 26, the adhesive layers had a surface resistance of $10^8$ to about $10^{11}$ Ω/cm$^2$, and exhibited good antistatic properties. Additionally, the surface protection sheets of Examples 17 to 26 had a suitable adhesive force of 0.1 to about 0.15 N/25 mm. Moreover, the surface protection sheets of Examples 17 to 26 exhibited good properties in terms of all of metal corrosiveness, adhesion to substrate, contamination of attachment target, low temperature stability, and transparency of adhesive layer.

On the other hand, as shown in Table 8, since the surface protection sheet of Example 26 contained neither the hydroxyl group-containing (meth)acrylamide nor the antistatic agent, it had a surface resistance of $10^{15}$ Ω/cm$^2$, thereby showing that Example 26 had lower antistatic properties than Examples 17 to 26. Further, Example 27 had a gel fraction stabilizing period of 10 days, which was longer than that of Examples 17 to 26.

Further, since Example 28 did not contain the hydroxyl group-containing (meth)acrylamide, it had a gel fraction stabilizing period of 10 days, which was longer than that of Examples 17 to 26.

Further, since Example 29 had a lower amount of the hydroxyl group-containing (meth)acrylamide, it had a surface resistance of $10^{14}$ Ω/cm$^2$, thereby showing that Example 29 had lower antistatic properties than Examples 17 to 26.

Further, since Example 30 had a higher amount of the hydroxyl group-containing (meth)acrylamide, it was evaluated as X in terms of adhesion to substrate and transparency of adhesive layer.

Further, since Example 31 had a lower amount of the hydroxyl group-containing (meth)acrylamide, it was evaluated as X in terms of contamination of attachment target.

Further, since Example 32 contained N,N-diethyl acrylamide, which is a monomer containing a nitrogen group without containing a hydroxyl group, it had a gel fraction stabilizing period of 10 days, which was longer than that of Examples 1 to 10, and was evaluated as X in terms of adhesion to substrate and contamination of attachment target.

As described above, embodiments may provide an adhesive composition that has a short aging time resulting in high productivity and permits the formation of an adhesive layer exhibiting good antistatic performance, and an optical member and a surface protective film including the same.

Embodiments may provide one or more advantages relative to comparative approaches. A comparative approach might be to provide a separate antistatic layer on a flat display panel, e.g., a cholesteric liquid crystal layer may be provided with a polarization member at one or either side thereof, the polarization member including an antistatic layer, a dichromatic polarizer, and a quarter wavelength plate. In an implementation, the flat display panel may be provided with an antistatic adhesive sheet that includes a base film, an antistatic layer containing a quaternary ammonium salt, and an adhesive layer stacked in this sequence. However, since the aforementioned techniques form the antistatic layer and the adhesive layer through separate processes, such techniques may have low productivity. On the other hand, if the antistatic agent is contained in the adhesive layer of the optical film or surface protective film, the adhesive layer may have antistatic properties, thereby eliminating the separate formation of the adhesive film and the antistatic layer. However, if a general adhesive layer is formed by coating an adhesive composition on the optical film or surface protective film, there can be problems of insufficient antistatic properties and productivity reduction resulting from a long aging time for forming the adhesive layer.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive composition for forming a peelable adhesive layer, the composition comprising:
a copolymer (A), the copolymer (A) being a copolymer of:
a hydroxyl group-containing (meth)acrylamide (a1), the hydroxyl group-containing (meth)acrylamide (a1) including at least one of a hydroxyl group-containing acrylamide and a hydroxyl group-containing methacrylamide, the hydroxyl group-containing (meth)acrylamide (a1) being represented by the following formula: $H_2C=C(R1)ACONHCH_2CH_2OH$, in which:
R1 is H or $CH_3$,
A is a linking group, the linking group being $(COOCH_2CH_2)_n$, $COOCH_2CH_2OOC-CH_2CH_2$, or Compound 1 represented by Chemical Formula 1:

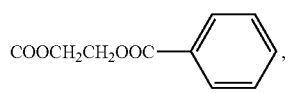

[Chemical Formula 1]

and
n is 1 or 2, and
a (meth)acrylate (a2), the (meth)acrylate (a2) including at least one of an acrylic ester and a methacrylic ester, the (meth)acrylate (a2) including at least one of methyl (meth)acrylate, ethyl (meth)acrylate, n-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, methoxyethyl (meth)acrylate, ethoxyethyl (meth)acrylate, butoxyethyl (meth)acrylate, cyclohexyl (meth)acrylate, t-butylcyclohexyl (meth)acrylate, phenoxyethyl (meth)acrylate, nonylphenoxy polyethylene glycol (meth)acrylate, benzyl (meth)acrylate, isobornyl (meth)acrylate, n-butyl acrylate, and tetrahydrofurfuryl (meth)acrylate,
wherein the copolymer (A) includes about 0.1 to about 10% by weight of the hydroxyl group-containing (meth)acrylamide (a1) and about 50 to about 99.1% by weight of the (meth)acrylate (a2) based on a total weight of the copolymer (A); and
an antistatic agent (B), the adhesive composition including about 0.01 to about 2.0% by weight of the antistatic agent (B), and the antistatic agent (B) including an ionic compound, wherein:
the copolymer (A) is crosslinked,
the copolymer (A) has a polystyrene conversion weight-average molecular weight of about 300,000 to about 1,000,000 as determined by gel permeation chromatography,
the composition has a gel fraction, at 3 days at 23° C. under a relative humidity of 50%, of about 90 to about 100% as a crosslinking degree,
the composition has an adhesive force of about 0.05 (N/25 mm) to about 0.2 (N/25 mm) measured according to JIS Z0237,
the ionic compound is at least one selected from a pyridinium salt, an alkyl pyrrolidium salt, and N-methyl-N-propylpiperidinium bis(trifluoromethanesulfonyl) imide, and
the composition provides an adhesive layer that has a sheet resistance of about $1 \times 10^8$ to about $1 \times 10^{11}$ $\Omega/cm^2$.

2. The adhesive composition as claimed in claim 1, wherein:
the adhesive composition is for a surface protection sheet.

3. The adhesive composition as claimed in claim 1, wherein:
the adhesive composition is for a surface protective sheet, and
the copolymer (A) includes about 50 to about 99.1% by weight of 2-ethylhexylacrylate as the (meth)acrylate (a2) based on a total weight of the copolymer (A).

4. The adhesive composition as claimed in claim 1, wherein:
the adhesive composition is for an optical member.

5. The adhesive composition as claimed in claim 1, wherein the copolymer (A) has a glass transition temperature (Tg) of about 0° C. or less.

6. A surface protection sheet, comprising:
a protective film; and
an adhesive layer formed on one or both sides of the protective film, the adhesive layer including the adhesive composition according to claim 1.

7. An adhesive composition for an optical member, the composition comprising:
a copolymer (A), the copolymer (A) being a copolymer of:
a hydroxyl group-containing (meth)acrylamide (a1), the hydroxyl group-containing (meth)acrylamide (a1) including at least one of a hydroxyl group-containing acrylamide and a hydroxyl group-containing methacrylamide, the hydroxyl group-containing (meth)

acrylamide (a1) being represented by the following formula: $H_2C=C(R1)ACONHCH_2CH_2OH$, in which:

R1 is H or $CH_3$,

A is a linking group, the linking group being $(COOCH_2CH_2)_n$, $COOCH_2CH_2OOC-CH_2CH_2$, or Compound 1 represented by Chemical Formula 1:

[Chemical Formula 1]

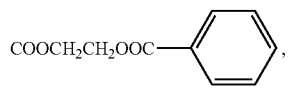

and n is 1 or 2, and a (meth)acrylate (a2), the (meth)acrylate (a2) including at least one of an acrylic ester and a methacrylic ester, the (meth)acrylate (a2) including at least one of methyl (meth)acrylate, ethyl (meth)acrylate, n-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, methoxyethyl (meth)acrylate, ethoxyethyl (meth)acrylate, butoxyethyl (meth)acrylate, cyclohexyl (meth)acrylate, t-butylcyclohexyl (meth)acrylate, phenoxyethyl (meth)acrylate, nonylphenoxy polyethylene glycol (meth)acrylate, benzyl (meth)acrylate, isobornyl (meth)acrylate, n-butyl acrylate, and tetrahydrofurfuryl (meth)acrylate;

wherein the copolymer (A) includes about 0.1 to about 10% by weight of the hydroxyl group-containing (meth)acrylamide (a1) and about 50 to about 99.1% by weight of the (meth)acrylate (a2) based on a total weight of the copolymer (A), and an antistatic agent (B), the adhesive composition including about 0.01 to about 2.0% by weight of the antistatic agent (B), and the antistatic agent (B) including an ionic compound, wherein:

the ionic compound is at least one selected from a pyridinium salt, an alkyl pyrrolidium salt, and N-methyl-N-propylpiperidinium bis(trifluoromethanesulfonyl) imide, the copolymer (A) is crosslinked, the copolymer (A) has a polystyrene conversion weight-average molecular weight of about 1,000,000 to about 2,000,000 as determined by gel permeation chromatography, the composition has a gel fraction, at 3 days at 23° C. under a relative humidity of 50%, of about 50 to about 80% as a crosslinking degree, and the composition provides an adhesive layer that has a sheet resistance of about $1\times10^8$ to about $1\times10^{11}$ $\Omega/cm^2$.

8. A surface protection sheet, comprising:

a protective film optical sheet; and an adhesive layer formed on one or both sides of the optical sheet, the adhesive layer including the adhesive composition according to claim 7.

* * * * *